(12) United States Patent
Miller et al.

(10) Patent No.: US 6,310,648 B1
(45) Date of Patent: Oct. 30, 2001

(54) USER INTERFACE FOR ELECTRONIC IMAGE VIEWING APPARATUS

(75) Inventors: Michael E. Miller, Rochester; Richard W. Lourette; Peter C. Fellegara, both of Fairport; Carolyn A. Bussi, Rochester; Michael J. Telek, Pittsford, all of NY (US); Matthew E. Hunter; Duncan R. Kerr, both of San Francisco, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/928,146

(22) Filed: Sep. 12, 1997

(51) Int. Cl.[7] .................................................. H04N 5/222
(52) U.S. Cl. ................................ 348/333.05; 348/333.11
(58) Field of Search ..................................... 348/207, 220, 348/221, 222, 239, 333.01, 333.02, 333.03, 333.04, 333.05, 333.1, 333.11, 333.12, 333.13; 386/96; H04N 5/222

(56) References Cited

U.S. PATENT DOCUMENTS

| | | |
|---|---|---|
| 4,742,369 | 5/1988 | Ishii et al. . |
| 5,018,017 | 5/1991 | Saaski et al. . |
| 5,093,907 | 3/1992 | Hwong et al. . |
| 5,157,511 | 10/1992 | Kawai et al. . |
| 5,297,253 | 3/1994 | Meisel . |
| 5,414,471 | 5/1995 | Saitoh et al. . |
| 5,517,605 | 5/1996 | Wolf . |
| 5,541,656 | 7/1996 | Kare et al. . |
| 5,606,655 | 2/1997 | Arman et al. . |
| 5,812,736 * | 9/1998 | Anderson ................. 386/96 |
| 5,903,309 * | 5/1999 | Anderson ................. 348/232 |
| 6,020,920 * | 2/2000 | Anderson ................. 348/222 |
| 6,122,003 * | 9/2000 | Anderson ................. 348/207 |
| 6,147,703 * | 11/2000 | Miller et al. .............. 348/220 |

FOREIGN PATENT DOCUMENTS 4-199091A   7/1992   (JP) ................................. G09G/5/00

OTHER PUBLICATIONS

U.S. application No. 08/769,573, Miller et al.
U.S. application No. 08/803,338, Lourette et al.
U.S. application No. 08/883,725, Miller et al.
"Digital Still Video: Sony's DSC–F1 Camera is Super Tiny with a Great Picture and Free Bundled Software" by Tony Gomez, from "Camcorder" magazine, Jun. 1997, pp. 55–65.
Casio's "Liquid Crystal Digital Camera QV–10B Owner's Manual".

* cited by examiner

Primary Examiner—Tuan Ho
(74) Attorney, Agent, or Firm—Pamela R. Crocker

(57) ABSTRACT

An apparatus for viewing and manipulating electronic image data corresponding to one or more images includes a display device for generating a displayed image from the electronic image data and for displaying a first set of graphical elements oriented in a direction substantially orthogonal to a second set of graphical elements. A first user control is arranged so that its direction of user engagement is oriented parallel to the first set of graphical elements for initiating one or more operations represented by the first set of graphical elements, and a second user control is arranged so that its direction of user engagement is oriented parallel to the second set of graphical elements for initiating one or more operations represented by the second set of graphical elements. By thus orienting the directions of user engagement for the first and second user controls substantially orthogonal to each other, user interaction is intuitively integrated with the visual presentation of the first and second sets of graphical elements.

14 Claims, 9 Drawing Sheets

USER INTERFACE FOR ELECTRONIC IMAGE VIEWING APPARATUS

CROSS-REFERENCE TO RELATED APPLICATION(S)

Reference is made to commonly assigned copending applications Ser. No. 08/769,573, entitled "Electronic Camera with Image Review" and filed Dec. 19, 1996 in the names of Michael E. Miller and Richard E. Lourette; and Ser. No. 08/883,725, entitled "Camera with User Compliant Browse and Display Modes" and filed Jun. 27, 1997 in the names of Michael E. Miller and Richard W. Lourette; and Ser. No. 08/803,338, entitled "Electronic Camera with Internal Fixed Album Memory" and filed Feb. 20, 1997 in the names of Richard W. Lourette, Peter Fellegara, Michael E. Miller, and Linda M. Antos, each of which are assigned to the assignee of this application.

FIELD OF THE INVENTION

The invention relates to electronic imaging and reviewing, and in particular to a user interface for an electronic apparatus capable of image viewing and editing.

BACKGROUND OF THE INVENTION

When designing an electronic image viewing and editing system, e.g., as a section of an electronic camera, the human interface with the system must support, above all other functions, the selection and viewing of images. As used herein, the human (or user) interface refers to the totality of the human interaction with the system, and the means for enabling such interaction, e.g., including the information presented by the system to the user, and by the user to the system, as well as the devices that enable such presentations. The system must also provide the ability to apply actions against these images, such as magnifying the images, deleting the images, or sharing the images via a display device. Such a system will often employ a very small display and limited area for user controls; therefore, it is important for the user interface to have as few buttons as possible, to present images that are visible on the small display, and to encourage interaction that is as intuitive as possible so as to tie usage of the buttons on the camera to the graphics on the display.

The mode of interaction varies dramatically in existing electronic cameras and software. For example, the QV-10 Liquid Crystal Digital Camera, sold by Casio Inc., uses dedicated buttons for image navigation (i.e., moving among images) and for image editing. Image navigation is accomplished by two buttons on the top of the camera, and image editing is accomplished by additional buttons also on top of the camera. In this configuration, each press of a button changes a single dedicated attribute of the image that is being viewed. This style of interaction is efficient when only a few attributes of the image can be altered. However, when a large number of attributes can be altered (in this example, greater than 4), the number of buttons required for this style of interaction quickly becomes too large to be practical. At the other extreme is the DSC-F1 Digital Still Camera, which is sold by Sony. In general, this camera provides a built in LCD screen and a large set of on-screen menus that are controlled by a button and a thumbwheel. The camera also provides buttons for image scrolling and numerous buttons for dedicated functions. However, this camera does not effectively tie the use of buttons on the camera to graphics on the display.

In addition, in an electronic digital camera such as the Casio QV-10, it is necessary for a user to review the stored images one by one to reach a particular one to be reviewed. For example, if the user is viewing image 1 and wishes to view image 20, he or she must press a button to advance to the next image at which time image 2 is generated and brought to the screen after about a 2 second delay required for the camera electronics to read and display the stored image. The user must again press the advance button at which time image 3 is generated and brought to the screen after another 2 second delay. This process must be repeated 19 times by the user who wishes to view image 20. This process requires better than 0.5 minute to complete. Such a method of scrolling through the images is therefore relatively time consuming and tedious.

In copending Ser. No. 08/803,338, a color display unit is provided on the back of the camera housing, and an edit switch and a directional switch unit is provided adjacent to the display unit. The directional switch unit is a four directional thumbpad segmented into four different individual directional switches. The user can then manually scroll through digital film images in forward and reverse directions by utilizing the right and left directional segments of the thumbpad. In this mode, as with the Casio QV-10, each image is shown individually as the user scrolls through the stored images. In a separate edit level, the edit switch is activated and a functional icon group is displayed. Then the user can utilize the up and down directional segments of the thumbpad to advance through the displayed function icons until the desired icon is highlighted. Then the edit switch is utilized to enable the highlighted function.

In copending Ser. No. 08/769,575, an electronic camera stores captured images and allows a user to relatively rapidly review any desired stored image, and to do so without repetitive actions. The camera displays a large image on its display device and a strip of low resolution images, including one in a preset strip position corresponding to the large image. The user can then navigate backwards and forward through the strip of images in the camera's storage device by pressing a forward button or a reverse button arrayed adjacent to the display device. If the user simply presses and releases the forward or reverse buttons, the low resolution images in the strip advance or reverse by one image, and the next corresponding large image is displayed.

None of the foregoing systems integrate frame selection and function enablement into a single presentation that intuitively leads the user through the available choices and options.

SUMMARY OF THE INVENTION

The present invention is directed to overcoming one or more of the problems set forth above. Briefly summarized, according to one aspect of the present invention, an apparatus for viewing and manipulating electronic image data corresponding to one or more images includes a display device for generating a displayed image from the electronic image data and for displaying a first set of graphical elements oriented in a direction substantially orthogonal to a second set of graphical elements. A first user control is arranged so that its direction of user engagement is oriented parallel to the first set of graphical elements for initiating one or more operations represented by the first set of graphical elements, and a second user control is arranged so that its direction of user engagement is oriented parallel to the second set of graphical elements for initiating one or more operations represented by the second set of graphical elements. By thus orienting the directions of user engagement for the first and second user controls substantially orthogonal to each other, user interaction is intuitively integrated with the visual presentation of the first and second sets of graphical elements.

The invention provides the advantage of a user interface that includes a minimal set of controls which are integrated with on-screen graphics in a manner as to reduce the apparent complexity and to increase the ease of using the device employing the interface. The interface provides strong spatial cues that line up the on-screen graphics with the user controls. This association of graphics with user controls provides an intuitive method of interacting with an image viewing and editing device. Despite the simplicity of the interface, it is extensible to provide access to both a number of top level functions or actions and to a number of layers. This interface can be applied to both electronic cameras with an electronic display, as well as, any device that can be used for image viewing and editing.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices and image viewing devices employing electronic sensors and electronic displays are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as described in the following materials, all such software implementation needed to practice the invention is conventional and within the ordinary skill in such arts. Furthermore, the user interface according to the invention is described for use with an electronic camera, but it should be understood that it could be applied to other devices, such as image scanners, stand-alone image viewers and editors, and so on.

Figure 1A:
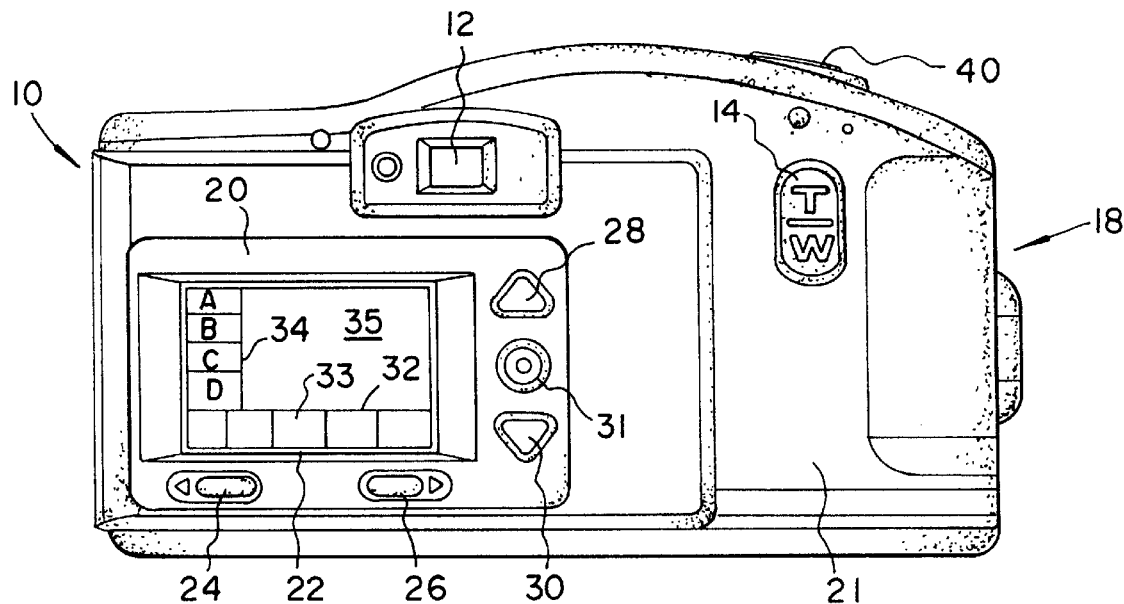
FIG. 1A is a view of a back of a camera employing a user interface according to the invention.

Accordingly, the user interface of the claimed image viewing and manipulating apparatus, including on screen graphics and user controls, will be described in relation to a user interface for a digital electronic camera. Referring first to FIG. 1A, a camera 10 seen from a rear view includes an optical viewfinder 12, a zoom lens control switch 14, a handgrip area 18, and a screen operation control unit 20, all mounted on a camera housing 21. More specifically, the screen operation control unit 20 includes a liquid crystal display (LCD) 22, first user interface controls comprising respective forward and backward image scroll buttons 24, 26 and second user interface controls comprising respective previous and next menu select buttons 28, 30, and an enter button 31.

The forward, backward image scroll buttons 24, 26 are positioned such that the direction of user engagement is oriented parallel to a first set of graphical elements 32, which in the preferred embodiment include a strip of captured images retrieved from a list of images stored in the camera's memory. The previous and next menu select buttons 28, 30 are positioned such that the direction of user engagement is oriented parallel to a second set of graphical elements 34, which in the preferred embodiment is a menu bar including a number of operations or functions that may be performed on a selected one of the images displayed in the image strip. Consequently, the direction of user engagement of the forward, backward buttons 24, 26 and the previous, next buttons 28, 30 are oriented substantially orthogonal to each other so as to intuitively integrate user interaction with the visual presentation of the first and second sets of graphical elements 32, 34. According to the preferred embodiment, relatively lower resolution images are displayed in the frame areas of the first set of graphical elements 32, and a single relatively higher resolution image is displayed in the display area 35 that is not obscured by the graphical elements 32, 34. It is preferable to have the higher resolution image in the display area 35 to be as large as possible, and at least as large as fifty per cent of the whole area of the display 22. Furthermore, a lower resolution image corresponding to the higher resolution image is shown in a preferred position 33 in the first set of graphical elements 22.

Figure 1B:
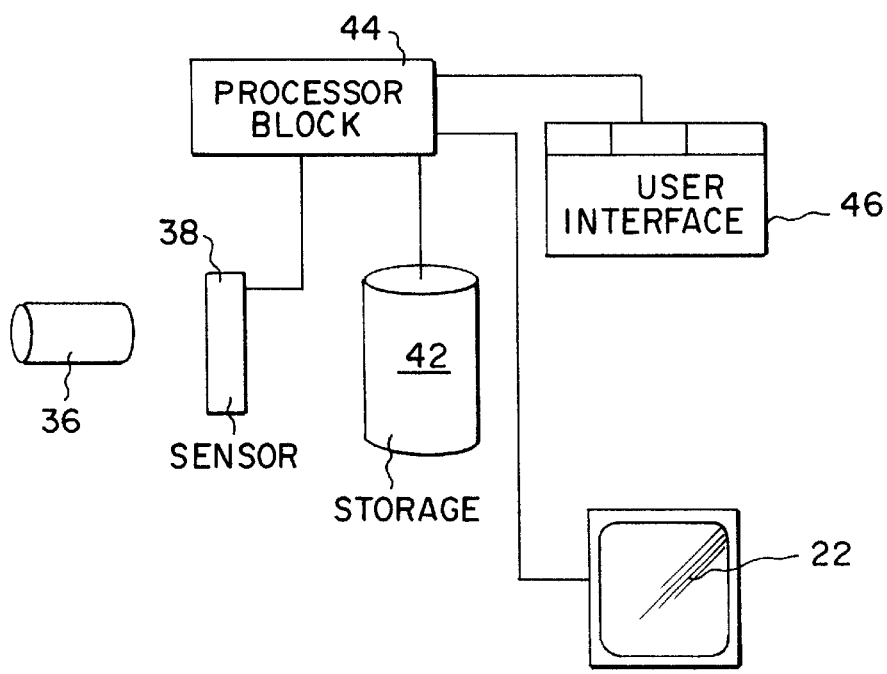
FIG. 1B is a block diagram of the camera shown in FIG. 1A.

Turning next to the block diagram of FIG. 1B, the camera 10 further includes a lens 36 which directs light from an object scene onto an image sensor 38. Typically the light passes through a known shutter and aperture mechanism (not shown), before striking the sensor 38. The shutter would typically be activated by a push button or similar user control, such as a shutter button 40 shown in FIG. 1A. The sensor 38 is typically a single array charge coupled device (CCD) sensor covered by a color filter array, although other devices (MOS, CMOS, charge injection, etc.) could be used. Alternatively, the sensor 38 could include three CCD sensors with appropriate filters/mirrors (not shown) being provided to direct red, green, and blue light onto respective sensors. All of the camera elements in FIG. 1B will typically be mounted on or within a single housing (such as the camera housing 21 of FIG. 1A). A battery compartment (not shown) is typically provided to receive one or more batteries for power. All of these components are conventional elements in electronic cameras. The camera is preferably portable, weighing no more than about 5 kg and preferably less than 2 kg (or even 1 kg), without batteries. When taking pictures (that is, capturing images), camera housing 21 will typically be held in a normal picture taking position with one hand folded around the hand grip 18 so that the screen operation control unit 20 is conveniently positioned in front of the user. References to components of the camera being above, below, to the side, and other phrases indicating relative positioning, are relative only with reference to the camera being in a horizontally positioned normal picture taking position (such as seen in FIG. 1A).

Continuing with the block diagram in FIG. 1B, the camera 10 includes a storage device 42, a processor block 44, buttons and controls used in the user interface 46, and a display device 22 such as the aforementioned LCD. Typically, the processor block 44 will retrieve images from the storage device 42 and show them on the display device 22. The processor block 44 will also retrieve some graphical elements from the storage device 42, such as the film strip element 32, and generate other graphical elements, such as the menu bar elements 34, and show these graphical elements on the display device 22. The processor block 44 will use inputs from the user interface buttons and controls 46 to determine which image or images to show on the display device 22, as well as which graphic or graphics to show on the display device 22. Although the elements in FIG. 1B are typically mounted on or within the single housing 21, the display device 22 may be external to the housing 21.

The processor block 44 includes appropriate circuitry to convert the information in the storage device 42 to an electronic signal that can be shown on the display device 22 in a known manner. The storage device 42 can be any suitable signal storage device, including optical, magnetic (such as a disk drive or tape drive) or solid state memory devices. The actual memory media used in storage device 42 is preferably removable, but need not be. The display device 22 may be any suitable compact, low power consuming display, preferably a liquid crystal display ("LCD") when included in the housing 21, or any acceptable electronic display when mounted external to the housing 21. The features of the camera 10 are controlled through the user interface 46. The user interface 46 may include discrete buttons, force sensors, or any other apparatus that can receive an input from a human operator and transform it into an electronic signal that can be provided to the processor block 44. The processor block 44 further includes a processor and other necessary hardware and/or software to operate the camera 10. The processor block 44 accordingly functions as the means for displaying the images and graphics of the present invention. In particular, the processor block 44 includes means for displaying a high resolution representation of an image in the display area 35 (see FIG. 1A) of the display device 22 and means for displaying a plurality of low or medium resolution representations of images in the first set of graphical elements 32. The processor block 44 also includes means for displaying the icons associated with the second set of graphical elements 34.

Figure 2:
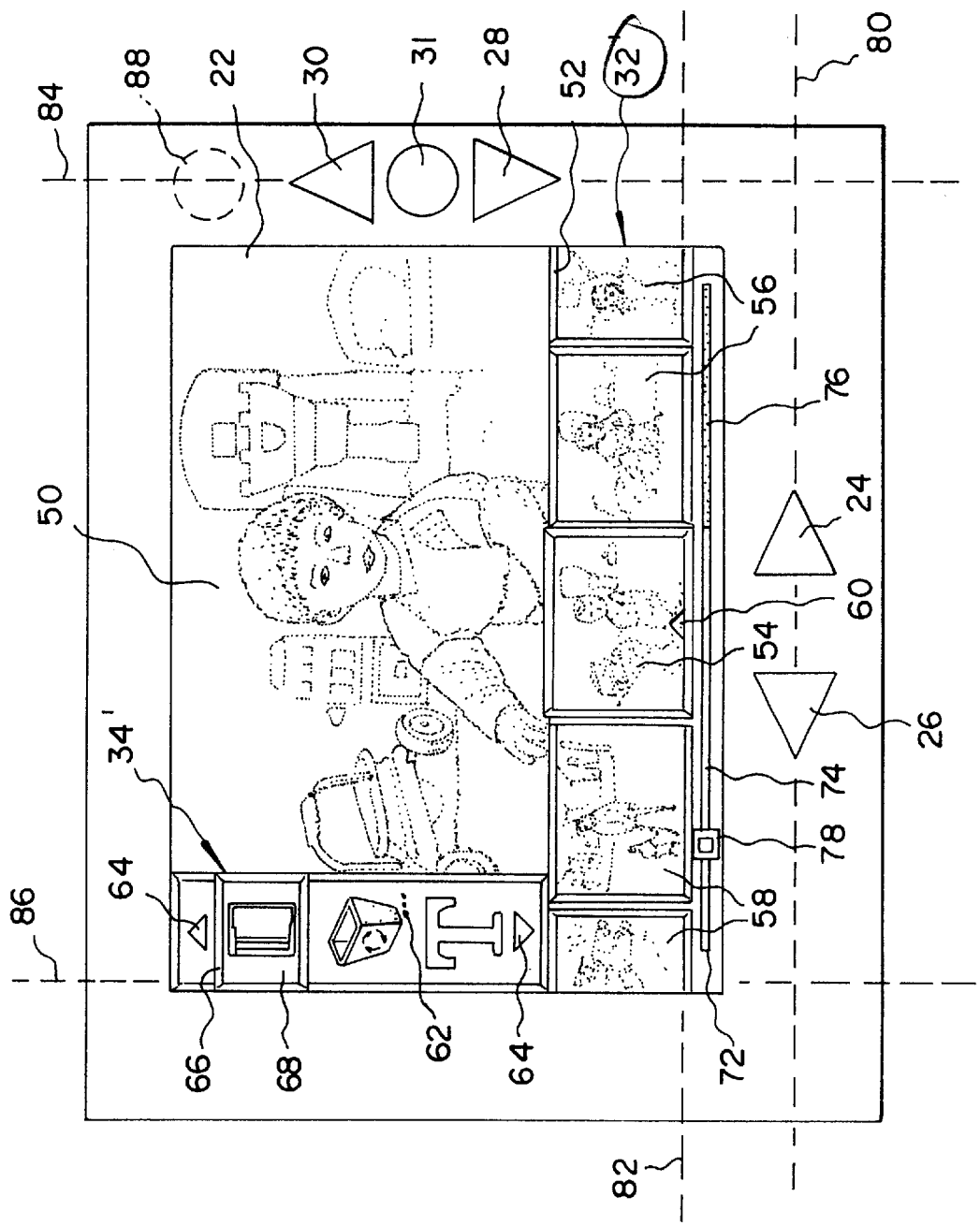
FIG. 2 is a partial back view of the camera shown in FIG. 1A illustrating the graphic elements and controls of the present invention.

FIG. 2 shows a partial back view of the camera 10, in particular showing the portion of the housing 21 that supports the LCD display 22 and the user interface controls 24 through 31. As images are stored in the storage 42 in the camera 10, a list of the stored images is generated by the processor block 44. When the camera is activated, an image 50 is initially shown in the display area 35 (as shown in FIG. 1A), e.g., the most recently captured image. The camera may also automatically display other graphical elements when activated. These graphical elements include the first set of graphical elements 32 (shown as a film strip 32' comprising elements 52–60), the second set of graphical elements 34 (shown as a menu bar 34' comprising elements 62–68), and a memory bar 72 (comprising elements 74–78). The film strip 32' refers to a combination of graphical and pictorial elements that represent a strip of film to the user. This element provides a metaphor of a strip of film that the user can move backwards and forwards on the display to browse images residing within the storage 42. The film strip 32' includes a graphical background 52, a view of a low resolution representation 54 of the current image 50, low resolution representations 56 of the next image or images in the list, low resolution representations 58 of the previous image or images in the list, and a graphical element 60 used to indicate the currently selected image 50 in the image list.

Figure 3:
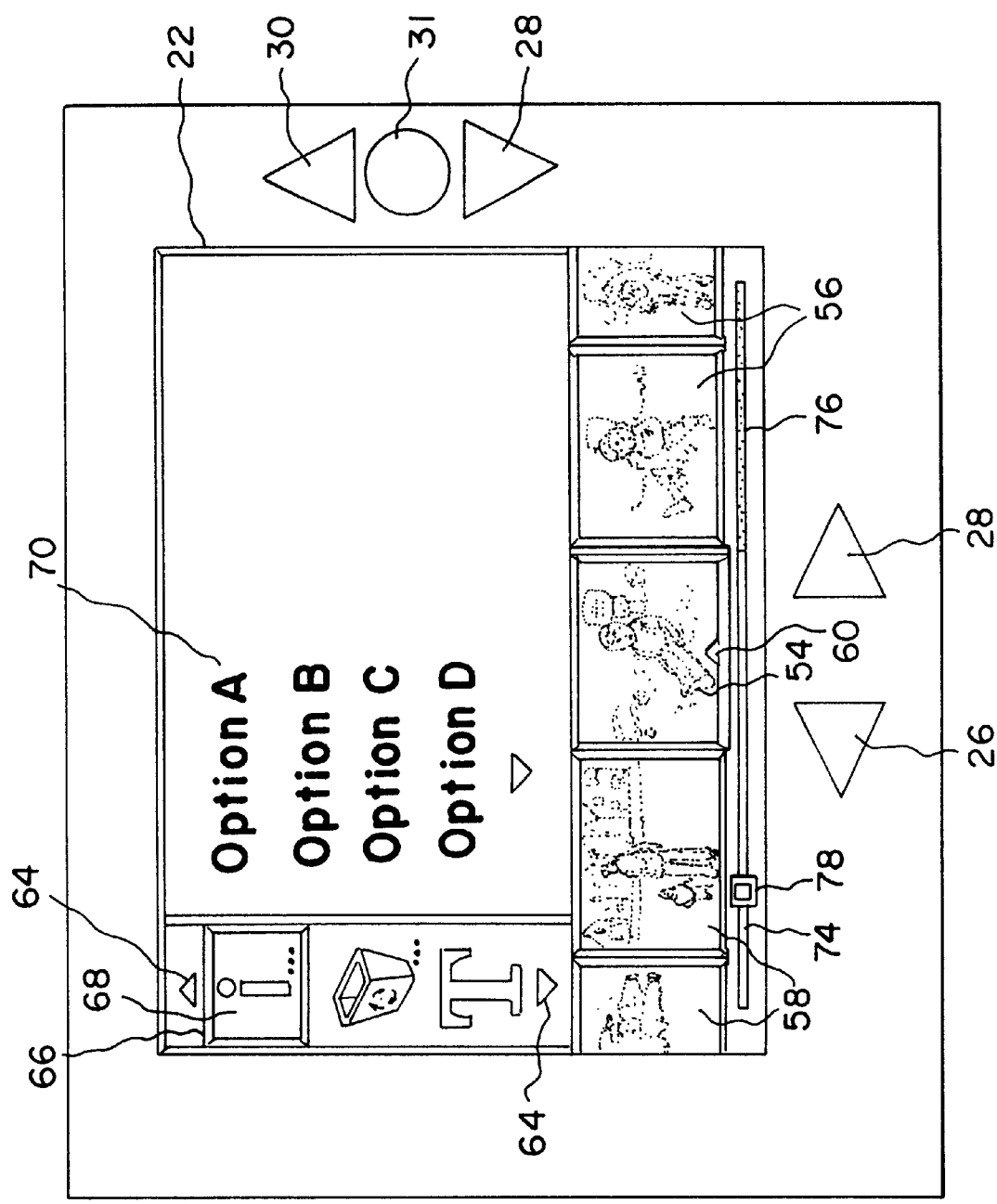
FIG. 3 is a partial back view of the camera shown in FIG. 1A illustrating the graphical elements and controls of the present invention with second level menus shown on a display.

The menu bar 34' includes symbolic representations of the functions or actions that can be applied to the image 50. These symbols may include text descriptions or iconic representations of these functions or actions. These symbols may include graphical representations of cascading menus 62 (i.e., the symbols " . . . "). The menu bar 34' may also provide symbolic scrolling elements 64 to indicate that the user may scroll to additional functions or actions that are not currently shown and a graphical selection element 66 to indicate the currently selected symbol 68. The previous and next buttons 28,30 are used to scroll through the functions, and the activity or operation associated with the selected symbol 68 is initiated by pressing the enter button 31. Finally, as depicted in FIG. 3, particularly when a cascaded representation is selected, the menu bar may be augmented with further options 70 once a function or action is entered. These options 70 are selected in the same manner as a function or action in the menu bar 34', that is, by using the previous and next buttons 28,30 to scroll through the options 70 and the enter button 31 to select an option.

The memory bar 72 refers to a graphical element that provides a representation of a first proportion 74 of an image storage area in the storage device 42 that actually contains image data, relative to a second proportion 76 of the available image storage area in the storage device 42 that does not contain image data. In other words, the currently stored list of images is represented by the first proportion 74. As a graphical representation, for example, the first proportion 74 may be lighter than the second proportion 76. The memory bar also includes an indication 78 of the position of the currently viewed image in the list of images that may be shown on the filmstrip 32'. The memory bar feature is further described in copending Ser. No. 08/769,573.

According to this invention, the user interface controls 24 through 31 are subdivided into two groups. The first group 24, 26 provides the user with the ability to scroll through images. The image scroll buttons are the forward button 24 and the backward button 26. It should be noted that these buttons are oriented such that a line 80 drawn through the centers of the forward and backward buttons 24, 26 is parallel to a line 82 drawn along the longest external edge of the memory bar 72 and the film strip 32'. The line 80 drawn through the forward button 24 and backward button 26 is also parallel to the motion of the graphical element 78 used to indicate the currently selected image on the memory bar 72 and the motion of the images in the film strip 32'. The relative orientations of the memory bar 72, the film strip 32', and the image scroll buttons 24, 26 are important as they provide a clear spatial cue for the function of the scroll buttons 24, 26.

The second group of user controls 28 through 31 provides the user with the ability to effect functions or actions on the currently displayed image. Such functions or actions include various ways in which the recorded images could be organized, retained, transferred, modified, etc.—e.g., commands to direct print via IR link to a printer, to delete an image, to apply a particular filter or image processing algorithm to the image, to insert text or sound, to transfer the image to a host processor, and so on. The second group of user controls includes the previous function and next function buttons 28 and 30, respectively. The previous and next function buttons 28, 30 allow the user to navigate to the symbolic representation of the desired function or action. These two buttons are oriented such that a line 84 drawn through the center of the previous and next function buttons 28, 30 is parallel to a line 86 drawn along the longest external edge of the menu bar 34'. Once again, the relative orientations of the menu bar 34', and the function buttons 28, 30 are important as they provide a clear spatial cue for the function of the previous and next function buttons 28, 30. This second group of controls also includes the enter button 31. The enter button 31 is used to execute a function or action after the function icon has been scrolled into the graphical selection element 66, where it is subject to selection.

Within this implementation, the enter button 31 is also used to display the menu whenever the menu bar 34, is not displayed. The menu bar 34' is then turned off through selection of one of the options (a "menu off" option) in the menu. Also in this implementation, the enter button 31 might toggle the LCD display 22 from the state shown in FIG. 2 to the state shown in FIG. 4, where the menu bar 34' and the film strip 32' are off and the camera would show only an image 50 on the display 22. When the user presses the enter button 31, the full set of graphical information including the memory bar 72, the film strip 32', and the menu bar 34' might be shown on the display 22 such that they cover portions of the image 50. This state is depicted in FIG. 2. Alternatively, the image could be reduced in size to fit into the display area 35. In a further embodiment, the second group of controls 28 through 31 may also include a menu button 88 (shown in broken line in FIG. 2). The menu button 88 is dedicated to the function of displaying or removing the menu bar 34', and perhaps the film strip 32' and memory bar 72, from the display 22. Alternatively, the menu button 88 could be used to display the menu bar 34' and the first usage of the forward and backward image scroll buttons 24, 26 could produce a display of the film strip 32'. It is important that both the enter button 31 and the menu button 88 be located in close proximity to the previous and next function buttons 28, 30 to minimize hand movement when executing multiple functions or actions if the user is intended to operate all of these buttons with a single hand.

Figure 4:
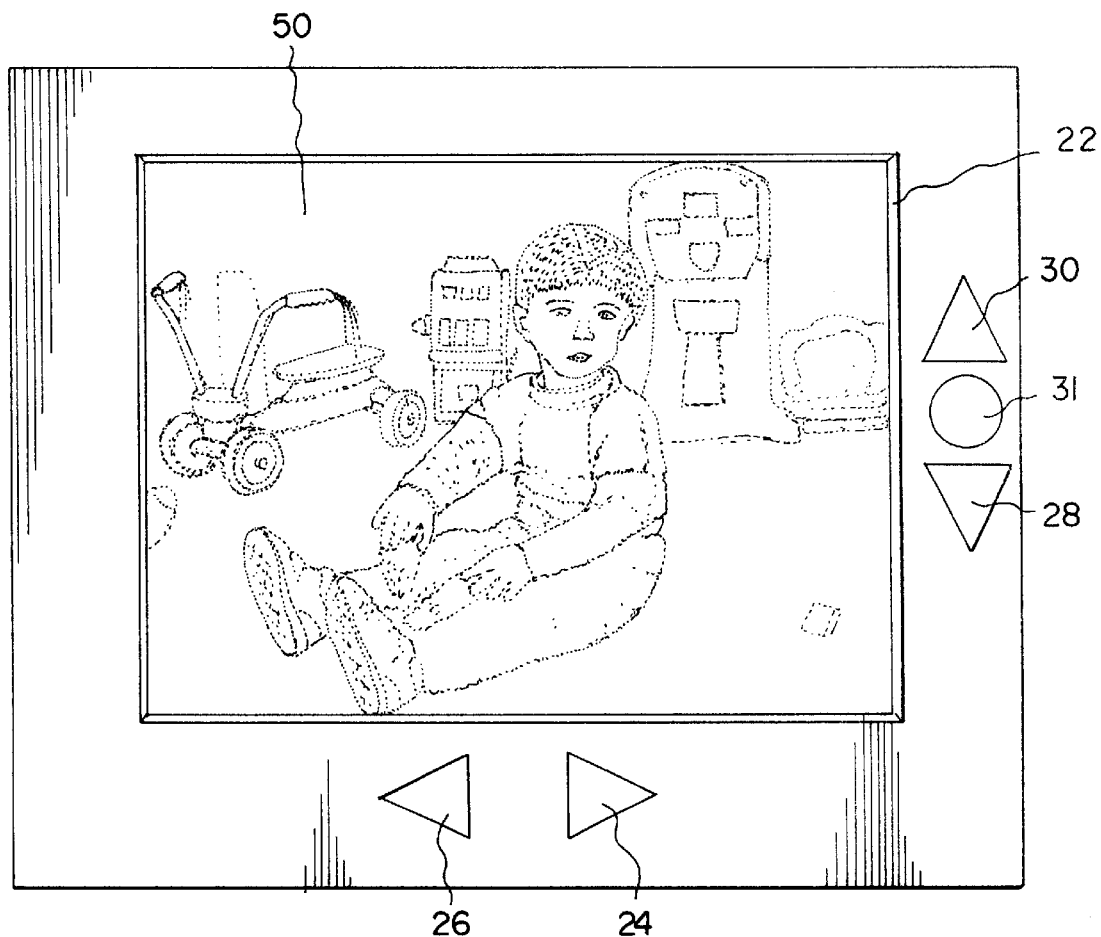
FIG. 4 is a partial back view of the camera shown in FIG. 1A with the graphical elements removed from the display.
Figure 5:
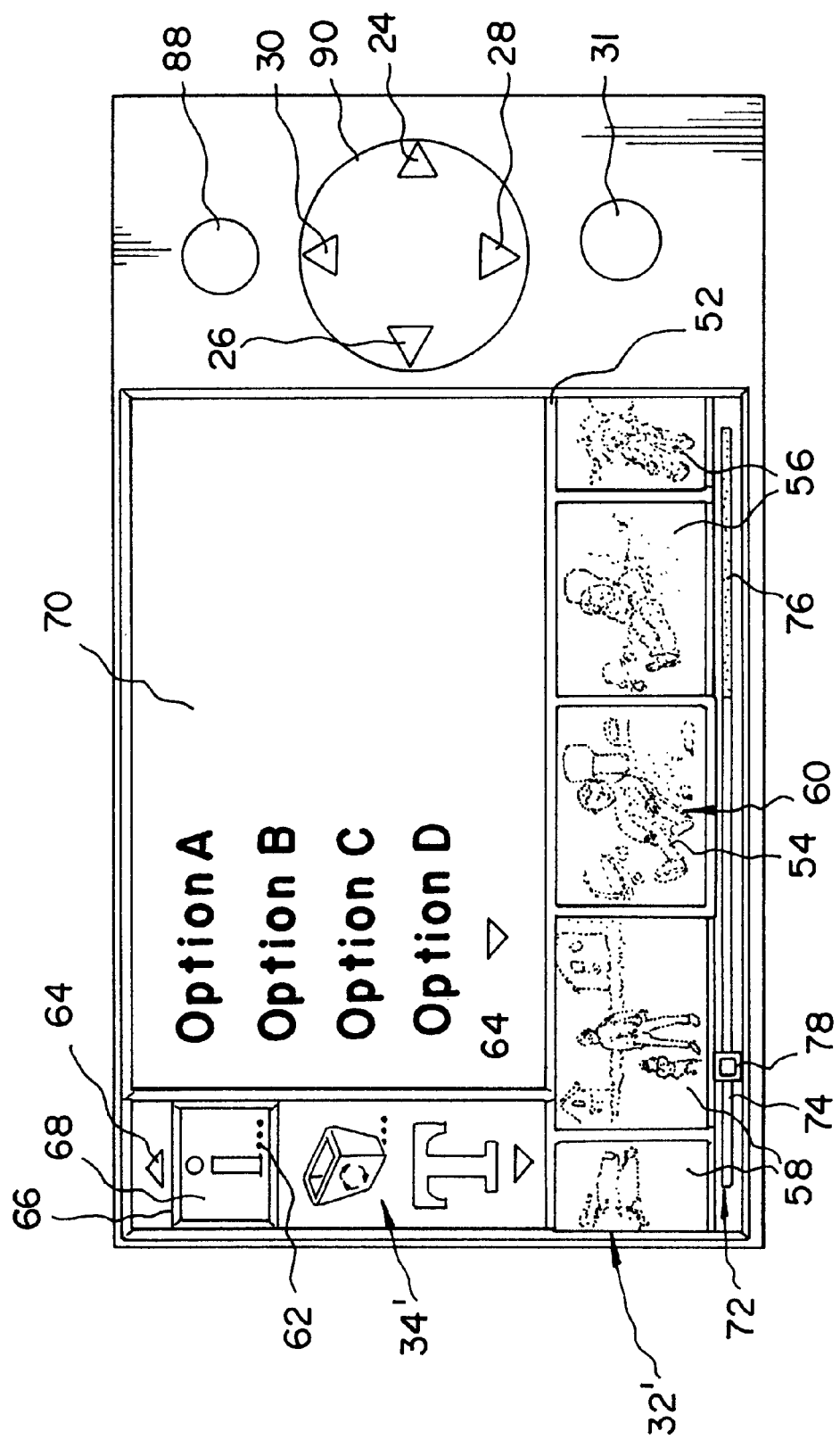
FIG. 5 is a partial back view of a further embodiment of the user interface shown in FIG. 1A, in particular showing four directional controls clustered into a single interface.

While FIGS. 2, 3 and 4 show the forward and backward image scroll buttons 24, 26 as one control cluster and a group of controls that include the previous and next function buttons 28, 30 as a separate cluster of controls oriented along the length and height dimensions of the display 22, respectively, an equally desirable configuration is to group these four controls into a single, four directional control such as a four directional controller 90 shown in FIG. 5 situated along one side of the display 22. Such a controller 90 may be a four directional thumbpad segmented into four different individual directional switches. However, it should be noted that it is still desirable for the forward and backward image scroll buttons 24 and 26 to be aligned parallel to the longest external edge of the memory bar 72 and the film strip 32'. Further, it is desirable for the previous and next function buttons 28 and 30 to be aligned parallel to the menu bar 34' and perpendicular (i.e., orthogonal) to the memory bar 72 and film strip 32'.

Figure 6:
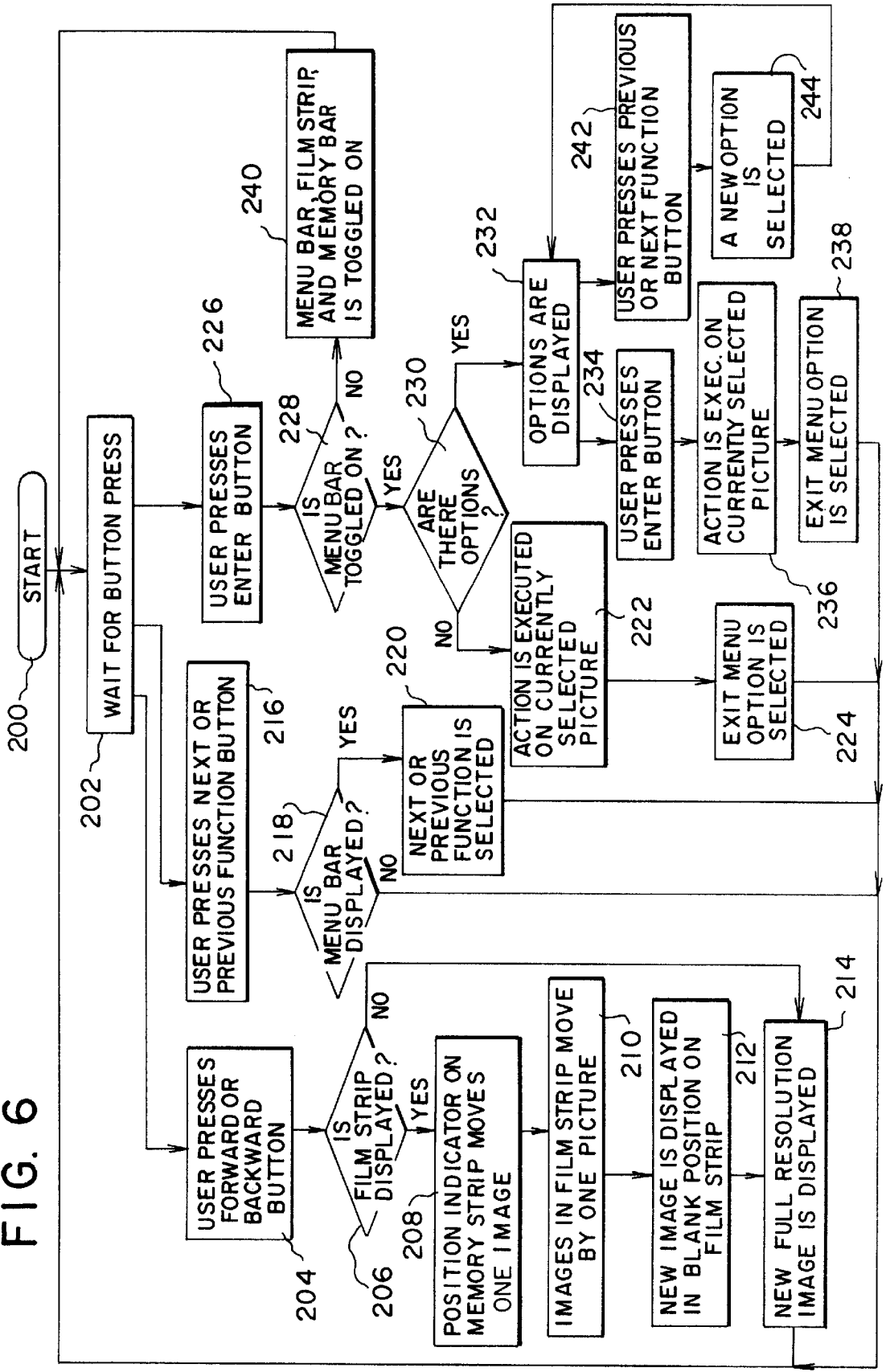
FIG. 6 is a flowchart illustrating the operation of the user interface shown in FIG. 1A.

FIG. 6 shows the image scrolling and editing method of the present invention, with the various steps identified in FIG. 6 within parentheses in the following description. First, a user turns on the display 22 and a startup procedure is then executed (200). It is assumed that the user has previously stored a number of images in the storage device 42. During the startup procedure (200), a full resolution representation 50 of the stored image, a series of low resolution images 54 through 58, the film strip graphic 52, the memory bar 72 and the menu bar 34' are displayed on the LCD screen 22 by operation of the processor block 44. The low resolution rendition 54 of the image that corresponds with the image 50 that is rendered with high resolution is positioned as indicated within the selection indicator 60. The processor block 44 then awaits a command from the user (202).

When the user presses the forward or backward button 24, 26 (204), the processor block 44 first determines if the film strip 32' and memory bar 72 is currently displayed (206). If they are not, the next full resolution image 50 is displayed (214) and the processor block 44 awaits the next user input (202). If the film strip 32' and the memory bar 72 are currently displayed, the position indicator 78 on the memory bar 72 is moved a distance equivalent to the proportion of the size of the image to the total size of the storage 42 (208). The low resolution renditions of the images 54 through 58 in the film strip 32' are also moved by one picture (210). A rendition of the next image in the image list stored in the storage 42 is displayed in the blank (right-most) position of the film strip (212). The full resolution rendition of the newly selected image is then displayed (214). As the user presses the forward or backward buttons 24, 26, new images are selected and shown as discussed above.

When the user presses the next or previous function button 28, 30 (216) the processor block 44 determines if the menu bar 34' is currently displayed (218). If it is not, the processor block 44 simply awaits the next button press (202). If the menu bar 34' is currently displayed, the previous or next function on the menu bar 34' is selected (220) and the processor block 44 awaits the next button press (202). When the user presses the enter button 31 (226), the processor block 44 first determines if the menu bar 34' is toggled on (228). If it is not, the memory bar 72, the film strip 32', and the menu bar 34' is toggled on (240) and displayed over a portion of the current image 50. In this condition, the processor block 44 then awaits the next button press (202).

If the menu bar 34' is currently toggled on (228), the processor block 44 may take on different actions depending upon whether a function or action has options as indicated by the graphical representation 68 of the cascade. If the currently selected function or action has no options (230), the selected action is executed on the image that is rendered as a full resolution image on the screen (222). It should be noted that, in this implementation, one of these options may be the option of turning off the memory bar 72, the film strip 32', and the menu bar 34' . If this option is executed, these items are turned off. After this function is executed, the exit menu option (i.e., the option of turning off the memory bar 72, the film strip 32', and the menu bar 34') is selected as the default menu option (224).

If the enter button 31 is pressed (226) and the currently selected function or action on the menu bar 34' has other options, the options are displayed (232). If the user then presses the enter button 31 (234), the function or action is executed on the image 50 that is rendered as a full resolution image on the screen (236). After this function is executed, the exit menu option (i.e., the option of turning off the memory bar 72, the film strip 32', and the menu bar 34' is selected as the default menu option. The processor block 44 then awaits the next button press (202). If the user presses the previous or next function button 28, 30 (242), while the options are displayed (232), a new option is selected in the options list 70 (244). The processor block 44 then awaits the next button press. It should also be noted that if the user presses the forward or backward scroll buttons 24, 26 while options are displayed, the device may execute the image scroll sequence (204 through 214). However, this option may depend on the screen space available to show both the image and the options list.

Figure 7:
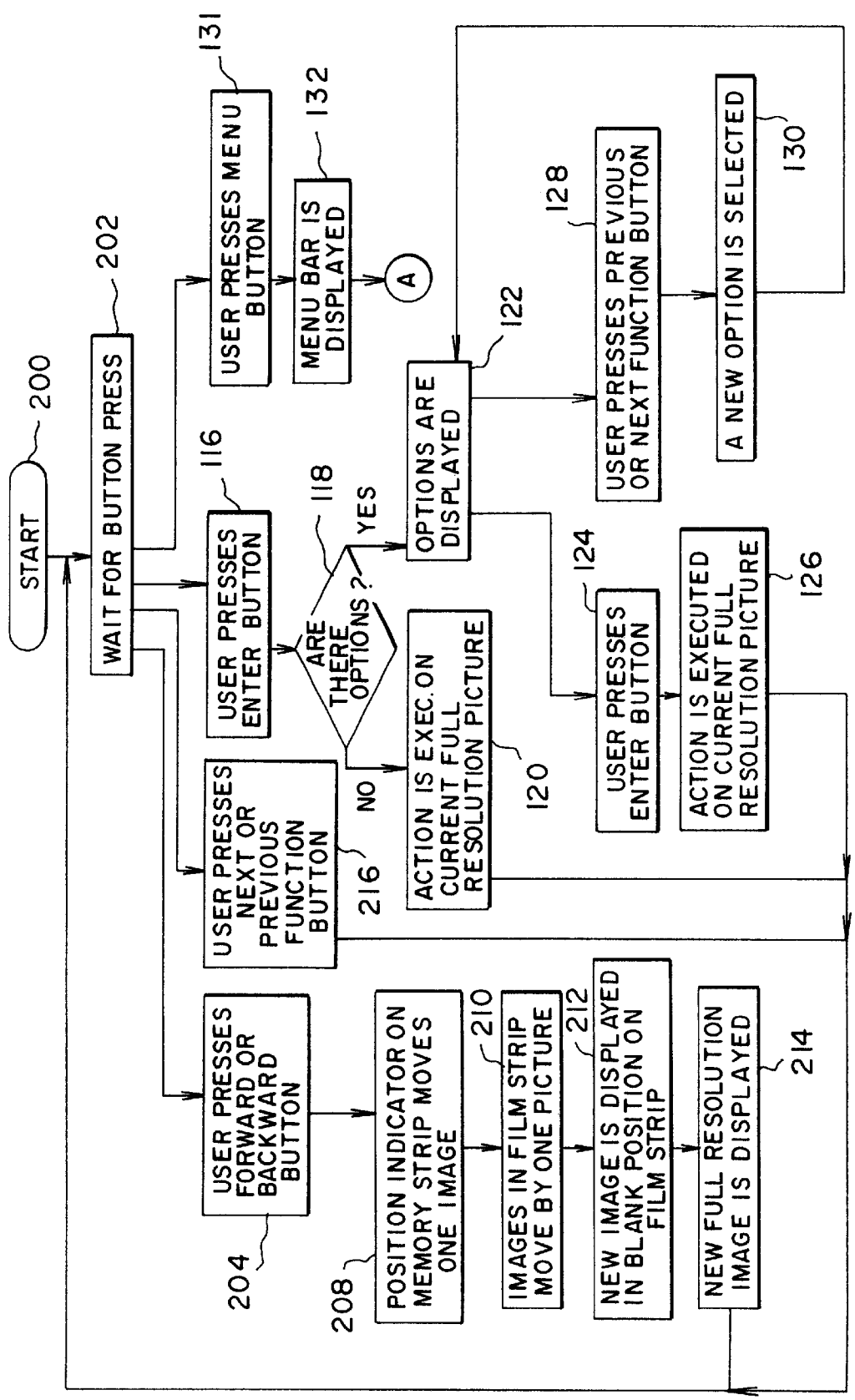
FIGS. 7–8 are flowcharts illustrating elements of a further embodiment for the operation of the user interface shown in FIG. 1A.
Figure 8:
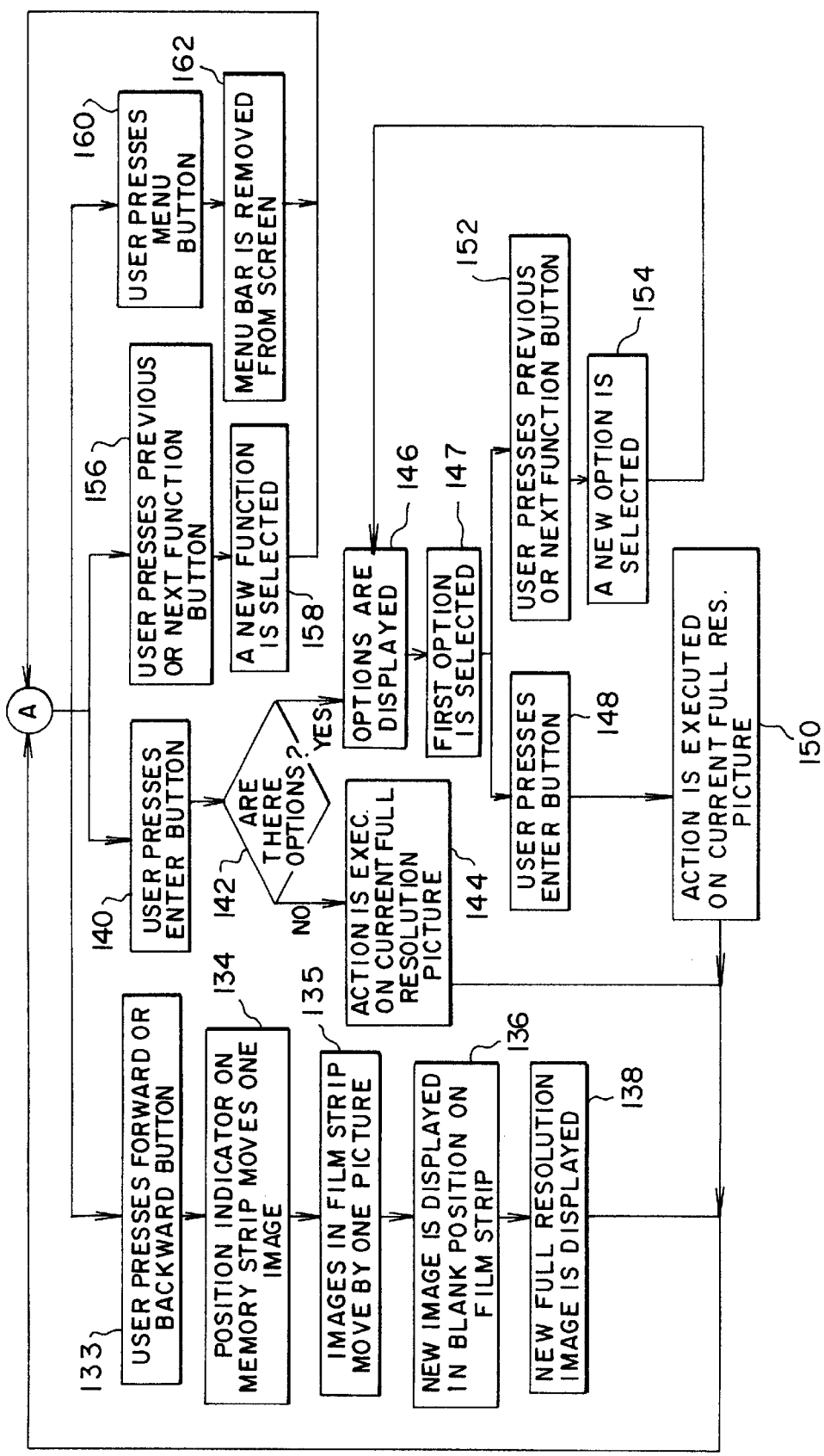

FIGS. 7 and 8 illustrate the user interface process in an alternative embodiment in which (a) the separate menu button 88 is used, and (b) a default function may be initiated even though the graphical elements for the filmstrip 32', the menu bar 34', or the memory bar 72 are not shown. Initially, the steps are the same as in FIG. 6. However, when the user presses the enter button 31 (116) without the menu bar 34' being displayed, a default function is initiated. For this to happen, the user will have preselected a default option during, e.g., a set up procedure. For example, one default option could be to display the time and date of the picture. The camera may take on different actions depending upon whether the default function or action has options. For example, there could be a choice of time/date, or the listing of the exposure parameters, e.g., shutter speed, aperture, flash on/off, etc. If the currently selected default function or action has no options (118), the action is executed on the image that is rendered as a full resolution image on the screen (120). For example, if the default is time/date, the time/date information is printed over the picture when the enter button 31 is pressed. If the currently selected function or action has other options, the options are displayed (122) and the first option is highlighted. If the user then presses the enter button 31 (124), the highlighted function or action is executed on the image that is rendered as a full resolution image on the screen (126). If the user presses the previous or next function button 28, 30 (128), a new option is highlighted in the options list 70 (130). It should be noted that if the camera contains only still images, the default function will usually be information. This option will simply provide textual information about the currently viewed image. However, if the camera allows the user to record and view still images with sound or if the camera allows the user to view motion sequences of images with or without sound, the default function may be to playback the sound and/or motion. The presence of sound or motion can be graphically represented with an on-screen icon with the associated image 50. According to this option, the time varying information (e.g., sound or motion) that is associated with the currently selected image will automatically play.

When the user presses the menu button 88 (131), the menu bar 34' is displayed (132). Once the menu bar is displayed, the user may remove the menu bar 34' from the screen at any point in time by pressing the menu button 88 again. If the menu bar 34' is displayed and the user presses the forward or backward button 24, 26, (133) the position indicator 60 on the memory bar 72 is moved a fraction of the length of the bar that is equal to the proportion of memory occupied by the next image in the image list to the total image memory in the storage 42 (134). The images in the film strip 32' are moved one picture (135). A new low resolution rendition of an image is displayed in the blank (right-most) position on the film strip 32' (136). A full resolution rendition of the currently selected image 54 is then displayed (138).

If the menu bar 34' is displayed and the user presses the enter button 31 (140), and there are no options, the currently selected function or action on the menu bar 34' is executed on the image that is represented by the currently displayed full resolution image 50 (144). If options are available, the options 70 are displayed (146). If the user presses the enter button 31 (148), the action represented by the currently selected option is executed on the image represented by the full resolution image 50 (150). If the user presses the previous or next function button 28, 30 while the options are displayed (152), a new option is selected (154). If the menu bar 34' is displayed and the user presses the previous or next function button 28, 30 (156), the next function or action is selected (158). Finally, if the menu bar 34' is displayed and the user presses the menu button 88 (160), the menu bar 34' is removed from the display and the portion of the image previously occluded by the memory bar is displayed (162).

The interface as described above provides strong spatial cues that line up the on-screen graphics with the user controls. This association of graphics with user controls provides an intuitive method of interacting with an image viewing and editing device. Additionally, this interface utilizes a minimum number of controls to further simplify the interface and allows the user to either select an image and apply an action to it or to select an action from the menu bar 34' and then select an image to which to apply the action. Despite the simplicity of the interface, it is extensible to provide access to both a number of top level functions or actions and to a number of layers. To provide a number of layers, each of the options might provide access to a deeper set of options which might then provide access to a deeper set of options and so forth.

It should be noted that although the term image is used throughout this disclosure, a person skilled in the art will realize that this same user interaction model may be applied to any image-centric multimedia object. This image-centric multimedia object may also contain sound, a series of images that represent a clip of digital video, or animated graphics. Attributes such as these may be depicted by graphical overlays on the image 50.

A person skilled in the art will also realize that while the interface discussed above is applied to image review where images in storage are being viewed, this same interface may be applied in an image preview system where images are viewed before they are placed into storage. In the preview system, the items in the menu bar 34' could represent changes in the behavior of the device during image capture. Within this paradigm, the second group of user controls 28 through 31 can be used to select objects in the menu bar 34' that affect the behavior of the capture device and the final image before it is stored. Such objects could enable the selection of different formats, crop aspect ratios, borders, exposure parameters, etc. before an image is captured.

Figure 9:
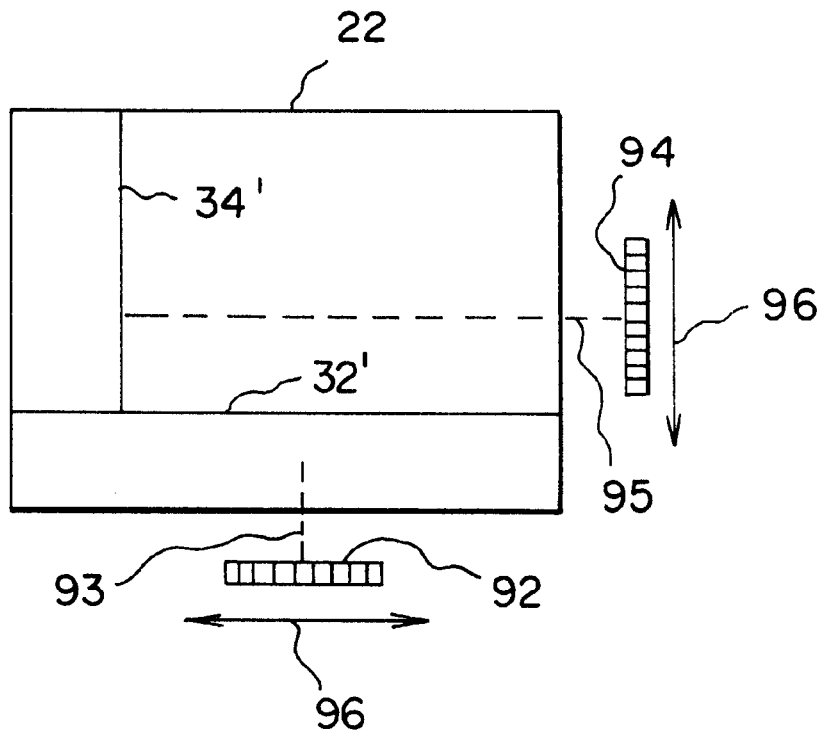
FIG. 9 shows an alternative embodiment for the interface controls shown in FIG. 1A.

While the first and second sets of user interface controls 24, 26, and 28, 30 have been described as buttons or switches that can be aligned in parallel with a corresponding dimension of respective sets of graphical elements, it is merely necessary that the direction of user engagement of the interface controls be oriented parallel to the respective graphical elements in order to obtain the benefits of the invention. For example, a rotatable element such as a thumbwheel can be used in place of the buttons as long as the user motion, e.g., thumb motion, is oriented parallel to the respective graphical elements. As would be apparent to those of ordinary skill in the camera arts, this could be done by recessing the thumbwheel into the camera housing such that its axis of rotation is perpendicular to the respective graphical elements and an edge of the thumbwheel protrudes from the housing such that the thumb slides over the edge in parallel to the graphical elements. For example, as shown in partial view in FIG. 9, the user interface includes a forward/backward thumbwheel 92 (shown in edgeview) that is oriented with its axis of rotation 93 perpendicular to the filmstrip graphical elements 32'; and a previous/next menu select thumbwheel 94 (also in edgeview) that is oriented with its axis of rotation 95 perpendicular to the menu bar 34'. Consequently, thumb motion represented by an arrow 96 will always be oriented parallel to the respective set of graphical elements.

Figure 10:
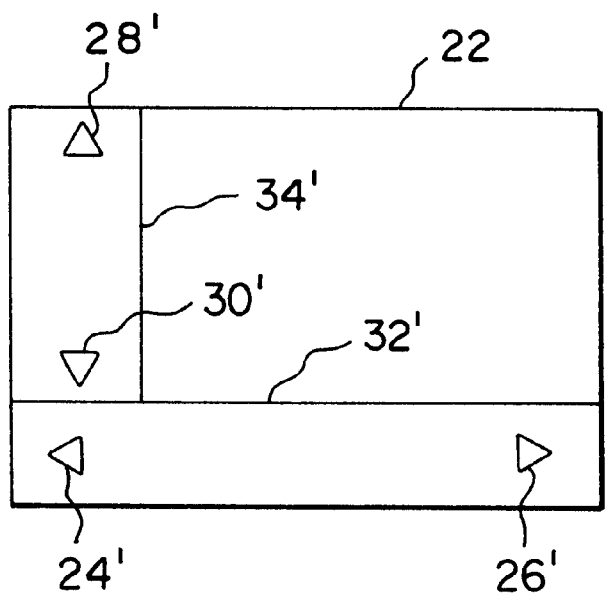
FIG. 10 shows a further alternative embodiment for the interface controls shown in FIG. 1A.

Furthermore, while the user interface controls 24,26 and 28,30 have been described as buttons or thumbwheels which are positioned on the camera housing separate from and adjacent to the display 22, the user interface controls 24,26 and 28,30 could be soft controls 24',26' and 28', 30' on the display itself, as shown in FIG. 10. This embodiment would be particularly useful if the display 22 is part of an image viewing and manipulating apparatus that allowed a much larger display than would be possible on a camera body. The soft controls 24',26' and 28',30' could be enabled in a number of ways; for example, the controls could be touch sensitive areas on the display 22 or could be triggered by a cursor that would be positioned over a respective control.

The invention has been described with reference to a preferred embodiment. However, it will be appreciated that variations and modifications can be effected by a person of ordinary skill in the art without departing from the scope of the invention.

PARTS LIST 10 camera
12 optical viewfinder
14 zoom lens control switch
18 handgrip area
20 screen operation control unit
21 ' camera housing
22 LCD
24 forward image scroll button
26 backward image scroll button
28 up menu select button
30 down menu select button
31 enter button
32 first set of graphical elements
32' filmstrip
33 preferred position
34 second set of graphical elements
34' menu bar
35 display area
36 lens
38 image sensor
40 shutter button
42 storage
44 processor block
46 user interface
48 display device
50 image
52 graphical background
54 low resolution representation of current image
56 low resolution representation of next images
58 low resolution representation of previous images
60 graphical element
62 graphical representation of cascading menus 62
64 symbolic scrolling elements
66 graphical selection element
68 currently selected symbol
70 further options
72 memory bar
74 first proportion
76 second proportion
78 indication
80 line
82 line
84 line
86 line
88 menu button
90 four directional controller
92 forward/backward thumbwheel
93 axis of rotation
94 previous/next thumbwheel
95 axis of rotation
96 thumb motion
116–162 steps
204–244 steps

What is claimed is:

1. A graphical user interface for selecting and viewing electronic image data corresponding to one or more images, and for controlling the presentation and editing of the images, said interface comprising:

a display device for generating at least one displayed image from the electronic image data;

means for producing on the display device first and second sets of graphical elements arranged orthogonal to each other, said first set including pictorial elements representing low resolution versions of a plurality of electronic images including the displayed image and said second set including graphical symbols identifying a plurality of operations that can be carried out on the displayed image;

a first set of at least two interface controls that are arranged on a first axis parallel to the first set of graphical elements in order to scroll through the low resolution versions of the electronic images; and a second set of at least two interface controls that are arranged on a second axis parallel to the second set of graphical elements in order to select an operation.

2. An interface as claimed in claim 1 wherein the first and second set of interface controls are user input elements located separate from but adjacent to the display device.

3. An interface as claimed in claim 1 wherein the first set and the second set of interface controls are respectively dispersed along a width-wise and height-wise dimension of the display device so as to intuitively integrate user interaction with the visual presentation of the first and second sets of graphical elements.

4. A graphical user interface as claimed in claim 1 wherein the display device is a liquid crystal display.

5. A graphical user interface as claimed in claim 1 wherein the pictorial elements of the first set of graphical elements are presented in the form of a filmstrip.

6. A graphical use interface as claimed in claim 1 wherein the interface controls are user engageable buttons.

7. A graphical user interface as claimed in claim 1 wherein the graphical user interface is part of a digital camera.

8. An interface as claimed in claim 1 wherein the first and second set of interface controls are grouped together on a single user input element having actuable sections that maintain the separate first and second axes so as to intuitively integrate user interaction with the visual presentation of the first and second sets of graphical elements.

9. An imaging apparatus for selecting and viewing electronic image data corresponding to one or more images, and for controlling the presentation and editing of the images, said imaging apparatus comprising:

a memory for storing the electronic image data;

a display device for producing a displayed image;

a processor section for retrieving the electronic image data from the memory and providing the retrieved data to the display device for producing a high resolution displayed image, said processor section also producing data for displaying a first set of graphical elements arranged perpendicular to a second set of graphical elements on the display device, wherein the first set of graphical elements provides a plurality of low resolution images in the form of a filmstrip including one lowresolution image that corresponds to the high resolution displayed image;

a first set of at least two interface controls that are arranged on a first axis parallel to the first set of graphical elements for manipulating the first set of graphical elements; and a second set of at least two interface controls that are arranged on a second axis parallel to the second set of graphical elements for manipulating the second set of graphical elements, wherein the first and second set of interface controls are arranged perpendicular to each other so as to line up user interaction with the visual presentation of the first and second sets of graphical elements.

10. An imaging apparatus as claimed in claim 9 wherein the first and second set of interface controls are combined in one operator input element having separately actuable sections arranged along one side of the display device.

11. An image capture apparatus for capturing electronic image data corresponding to one or more images, and for selecting, viewing, and controlling the presentation and editing of the captured images, said image capture apparatus comprising:

a housing for containing components of the image capture device;

an optical section mounted on the housing for focusing image light upon an image plane;

an image sensor positioned at the image plane for generating electronic image data;

a memory first storing the electronic image data captured by the image sensor, a display device mounted on the body for producing a displayed image;

a processor section for retrieving the electronic image data from the memory and providing the retrieved data to the display device for producing a high resolution displayed image, said processor section also producing data for displaying a first set of graphical elements arranged perpendicular to a second set of graphical elements on the display device, wherein the fist set of graphical elements provides a plurality of low resolution images in the form of a filmstrip including one low resolution image that corresponds to the high resolution displayed image;

a first set of at least two interface controls that are arranged on the housing adjacent to the display device on a first axis parallel to the first set of graphical elements for manipulating the first set of graphical elements; and a second set of at least two interface controls that are arranged on the housing adjacent to the display device on a second axis parallel to the second set of graphical elements for manipulating the second set of graphical elements, wherein the first and second set of interface controls are arranged perpendicular to each other so as to line up user interaction with the visual presentation of the first and second sets of graphical elements.

12. An imaging apparatus as claimed in claim 11 wherein the first and second set of interface controls are combined in one operator input element having separately actable sections arranged along one side of the display device.

13. An imaging apparatus for selecting and viewing electronic image data corresponding to one or more images, and for controlling the presentation and editing of the images, said imaging apparatus comprising:

a memory for storing the electronic image data;

a display device for producing a displayed image;

a processor section for retrieving the electronic image data from the memory and providing the retrieved data to the display device for producing the displayed image, said processor section also producing data for displaying a first set of graphical elements arranged perpendicular to a second set of graphical elements on the display device, the second set of graphical elements being a plurality of operations presented in the form of a menu bar;

a first set of at least two interface controls tat arranged on a first axis parallel to the first set of graphical elements for manipulating the first set of graphical elements; and a second set of at least two interface controls that are arranged on a second axis parallel to the second set of graphical elements for manipulating the second set of graphical elements, wherein the first and second set of interface controls are arranged perpendicular to each other so as to line up user interaction with the visual presentation of the first and second sets of graphical elements.

14. An image capture apparatus for capturing electronic image data corresponding to one or more images, and for selecting, viewing, and controlling the presentation and editing of the captured images, said image capture apparatus comprising:

a housing for containing components of the image capture device;

an optical section mounted on the housing for focusing image light upon an image plane;

an image sensor positioned at the image plane for generating electronic image data;

a memory for storing the electronic image data captured by the image sensor;

a display device mounted on the body for producing a displayed image;

a processor section for retrieving the electronic image data from the memory and providing the retrieved data to the display device for producing the displayed image, said processor section also producing data for displaying a first set of graphical elements arranged perpendicular to a second set of graphical elements on the display device, the second set of graphical elements being a plurality of operations presented in the form of a menu bar, a first set of at least two interface controls that are arranged on the housing adjacent to the display device on a first axis parallel to the first set of graphical elements for manipulating the first set of graphical elements; and a second set of at least two interface controls that are arranged on the housing adjacent to the display device on a second axis parallel to the second set of graphical elements for manipulating the second set of graphical elements, wherein the first and second set of interface controls arranged perpendicular to each other so as to line up user interaction wit the visual presentation of the first and second sets of graphical elements.

* * * * *